United States Patent
Ruetz et al.

(10) Patent No.: US 8,502,528 B2
(45) Date of Patent: Aug. 6, 2013

(54) ARRANGEMENT FOR DETECTING A ROTATION ANGLE

(75) Inventors: Christian Ruetz, Ludwigsburg (DE); Roman Schoepe, Maulbronn (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 359 days.

(21) Appl. No.: 12/864,669

(22) PCT Filed: Feb. 10, 2009

(86) PCT No.: PCT/EP2009/000911
§ 371 (c)(1), (2), (4) Date: Oct. 14, 2010

(87) PCT Pub. No.: WO2009/106227
PCT Pub. Date: Sep. 3, 2009

(65) Prior Publication Data
US 2011/0043198 A1    Feb. 24, 2011

(30) Foreign Application Priority Data
Feb. 27, 2008    (DE) ........................ 10 2008 011 448

(51) Int. Cl.
*G01B 7/30*    (2006.01)
(52) U.S. Cl.
USPC .................................................. 324/207.25
(58) Field of Classification Search
USPC .................................................. 324/207.25
See application file for complete search history.

(56) References Cited

U.S. PATENT DOCUMENTS
5,646,523 A    7/1997    Kaiser et al.

FOREIGN PATENT DOCUMENTS

| DE | 195 06 938 A1 | 8/1996 |
|---|---|---|
| DE | 197 03 903 A1 | 8/1998 |
| DE | 197 39 823 A1 | 3/1999 |
| DE | 100 60 287 A1 | 6/2001 |
| DE | 103 05 592 A1 | 8/2004 |
| DE | 10 2006 015 361 A1 | 10/2006 |
| EP | 0015748 A2 | 9/1980 |
| EP | 1 477 389 A2 | 11/2004 |
| EP | 1 731 876 A1 | 12/2006 |
| EP | 1 892 498 A1 | 2/2008 |

OTHER PUBLICATIONS

International Search Report w/translation from PCT/EP2009/000911 dated Oct. 15, 2009 (4 pages).

*Primary Examiner* — Reena Aurora
(74) *Attorney, Agent, or Firm* — Osha • Liang LLP

(57) ABSTRACT

The invention relates to an arrangement for detecting rotation angles on a rotating component, having transducers and sensors, detecting a physical variable as digitally processable signals as a function of the rotation angle change of the rotating component. The rotating component has at least one satellite of a smaller circumference that is coupled at the circumference thereof and rotates by means of the rotation thereof, preferably having an angle sensor, which drives a likewise rotating hypocycloidal disc or hypocycloidal gear wheel via an axially coupled hypocycloidal gearbox, the circumferential speed of which can be geared down by the hypocycloidal gearbox such that a speed of the rotating component and the absolute wheel angle across multiple revolutions of the steering axle can be determined using a revolution sensor system.

11 Claims, 4 Drawing Sheets

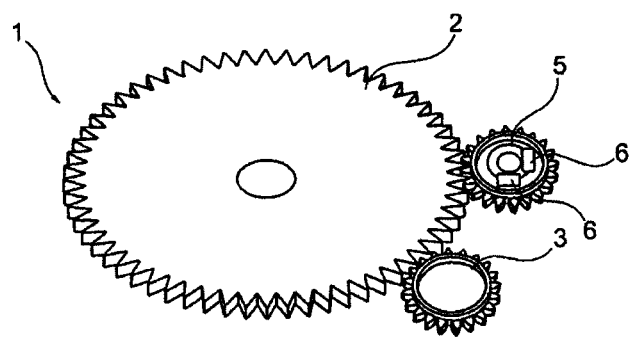
Fig. 1
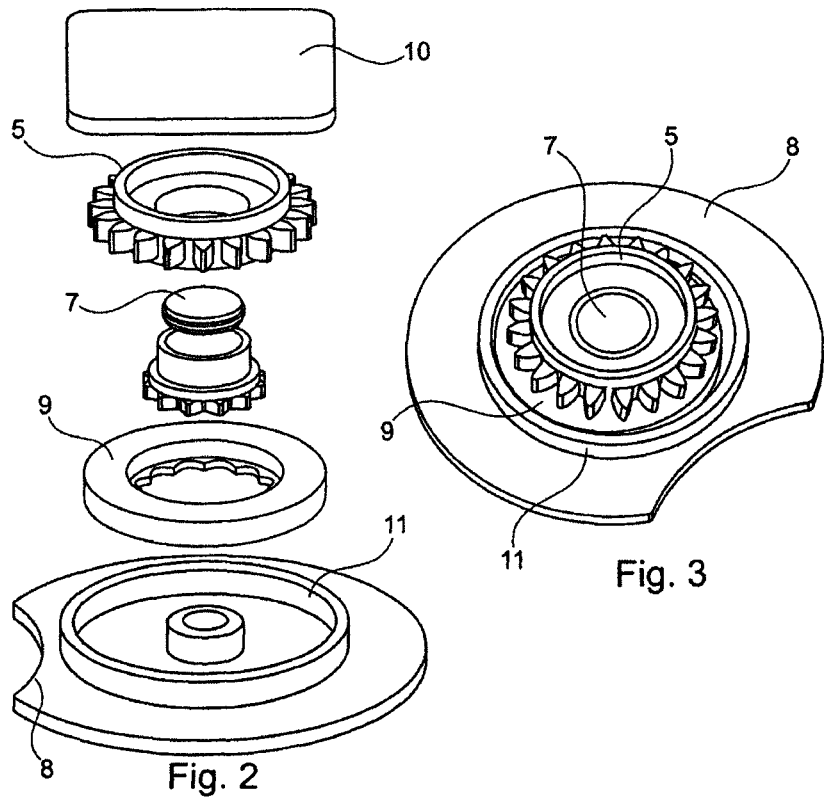
Fig. 2
Fig. 3

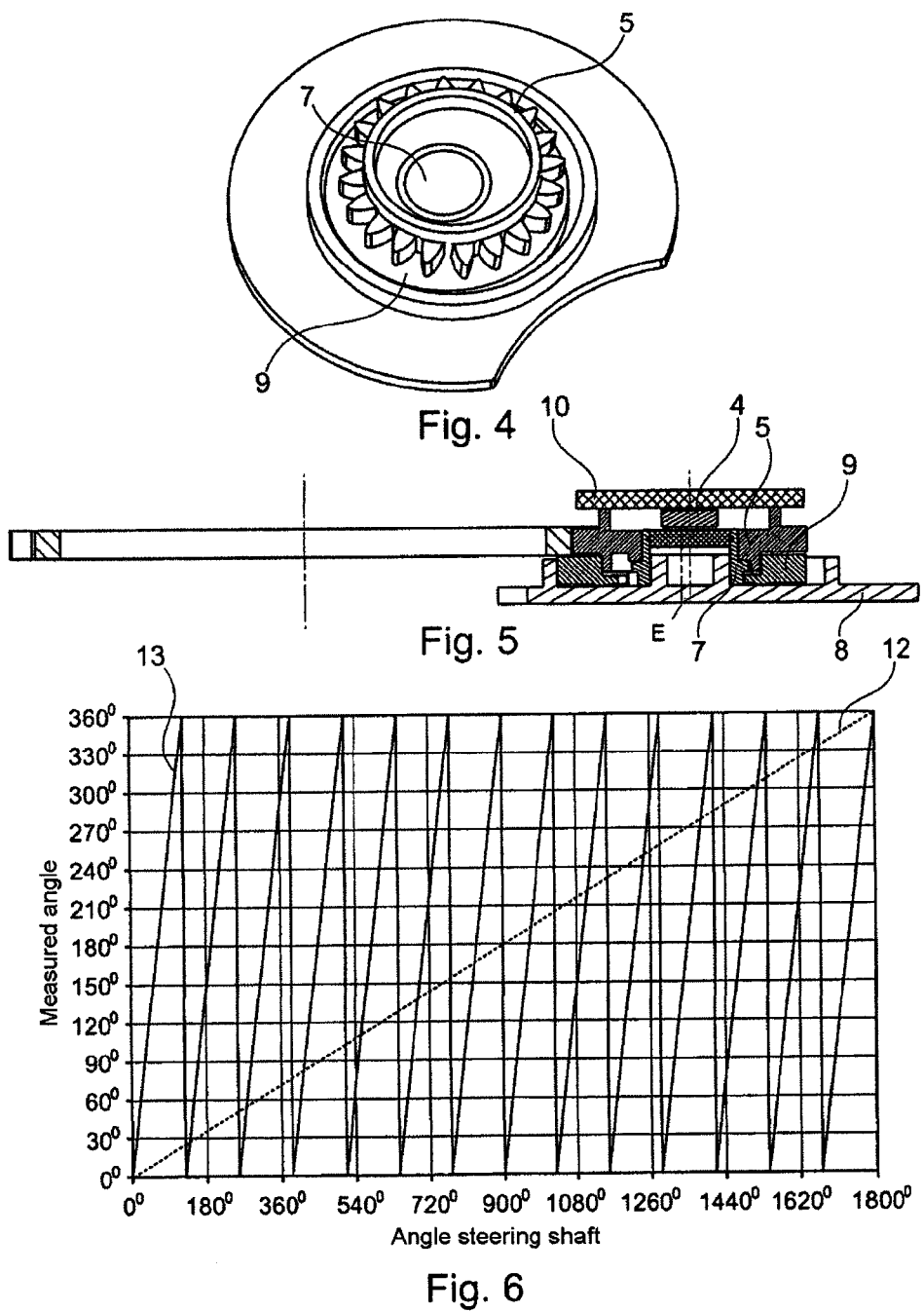

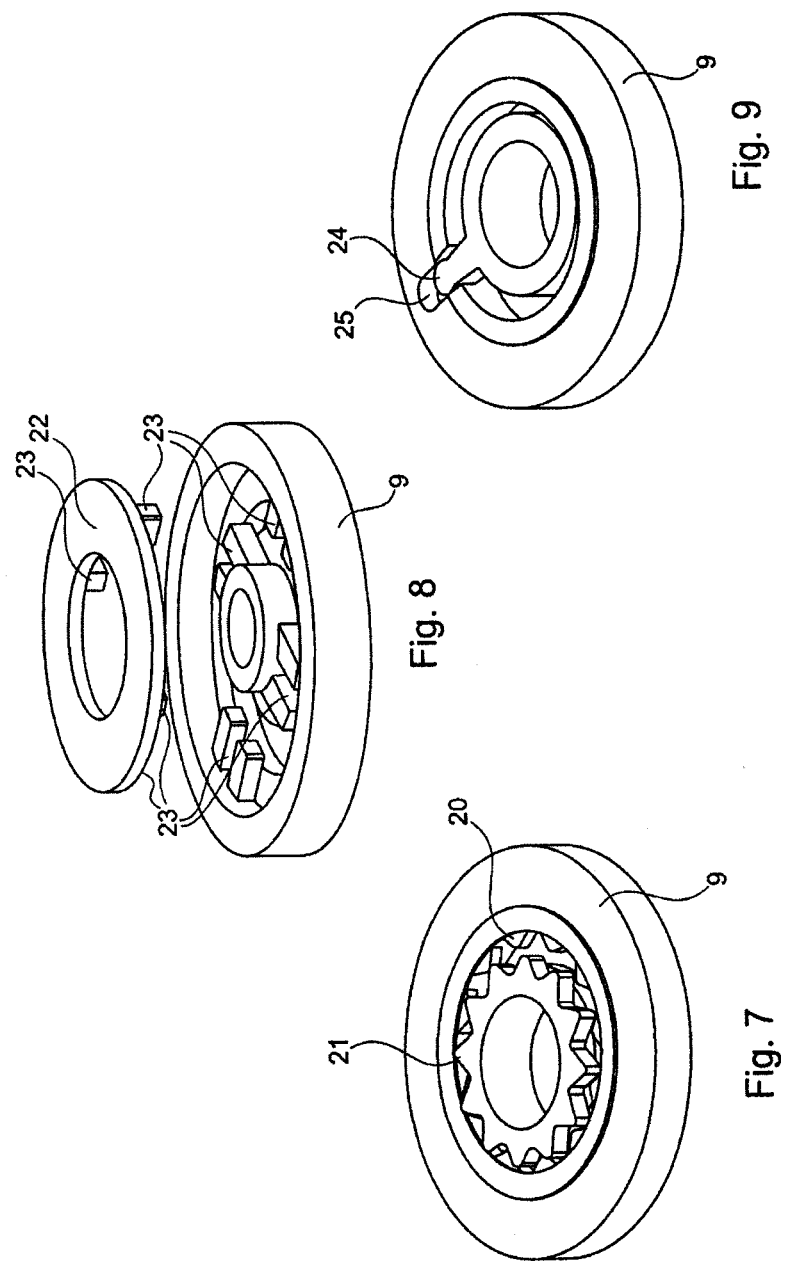

ARRANGEMENT FOR DETECTING A ROTATION ANGLE

PRIOR ART

The invention relates to an arrangement, for detecting a rotation angle of a rotating component, for example in a gearbox device or a steering device in a motor vehicle, according to the generic type of the main claim.

In a steering angle sensor which is known from DE 197 03 903 A1 and has the purpose of detecting the rotation angle according to the method described in the introduction, a sensor is constructed in such a way that it detects the rotation angle of the steering wheel in a contactless fashion, for example with Hall sensors. For electronic open-loop and closed-loop control systems in a motor vehicle, determination of the rotation angle and of the rotational speed of the steering wheel is as a rule often highly significant for making available an absolute actual signal relating to the steering wheel position or relating to a change in rotation angle of the steering wheel. In this context, this known sensor measures exclusively the relative angle between the rotatable steering spindle and the steering column which is a fixed component of the chassis of the vehicle.

It is known per se from DE 100 60 287 A1 that when a plurality of code tracks are used on the rotating component different coding is used in such a way that with a Nonius method or with a modified Nonius method it is also possible to determine the rotation angles taking into account the rotational speed of the rotating component, to determine the absolute rotational travel carried out, for example in the case of a steering wheel or in the case of a step-up transmission.

DE 103 05 592 A1 describes that two measurements are performed on the rotating component, wherein here the changes in angle are respectively recorded on various diameters of the rotating component. DE 195 06 938 A1 and DE 197 39 823 A1 discloses that two different gearwheels, each with a different number of teeth, on the rotating component detect the revolutions so that with a Nonius method or with a modified Nonius method it is also possible to determine the rotation angles here by taking into account the rotational speed of the rotating component.

In addition, EP 15748 A1 and DE 102006015361 A1 disclose per se what are referred to as hypocycloidal transmissions, in which a flange is provided with a circular toothing, which is associated, for example, with a hypocycloidal transmission or what is also referred to as a circumferential rolling contact transmission, for example for a joint mechanism on a vehicle seat.

SUMMARY OF THE INVENTION

The invention is based on an arrangement for detecting rotation angles on a rotating component having signal generators and sensors which detect changes in a physical variable which are generated by the signal generators as a function of the change in rotation angle of the rotating component, as signals which can be evaluated digitally. According to the invention, in order to form a cost-effective arrangement which can be implemented in the small installation space, it is proposed that the rotating component has at least one satellite which is coupled to the circumference of said rotating component, rotates as a result of its rotation and has a relatively small circumference with an angle sensor, which satellite advantageously drives, via an axially coupled hypocycloidal transmission, a hypocycloidal disk which also rotates and whose rotational speed can be stepped down by means of the hypocycloidal transmission in such a way that an rpm of the rotating component and the absolute steering angle can be determined therefrom over a plurality of revolutions of the steering shaft by means of a rotation sensor.

The invention can advantageously be used in a steering device in a motor vehicle, with the result that the angle sensor is located on the circumference of a rotating shaft, preferably as a steering angle sensor on the circumference of a steering shaft.

In this context, the arrangement according to the invention can advantageously be embodied in such a way that hypocycloidal transmission is composed of a hypocycloidal disk which is coupled axially to the satellite and which is offset in axis-parallel fashion with respect to the satellite by a predefined absolute value E. The rotation signal generator and the satellite are concentric here, and the satellite has a contour which is offset with respect to its axis of symmetry by the predefined absolute value E and is coupled to the hypocycloidal disk or drives the latter, wherein the hypocycloidal disk has an internal recess for the rotation signal generator, which recess is coupled mechanically to said hypocycloidal disk in each case in a changing region as a result of the axis parallelism which is offset by the absolute value E, and is respectively driven by the hypocycloidal disk.

However, it is alternatively possible for the rotation signal generator also to be mounted in a locationally fixed manner in the hypocycloidal disk so that said rotation signal generator then carries out a tumbling movement with respect to the sensor.

According to a first embodiment, the mechanical coupling of the rotation signal generator in the internal recess of the hypocycloidal disk is carried out by means of a corresponding gearwheel structure. In a second embodiment, the mechanical coupling of the rotation signal generator in the internal recess of the hypocycloidal disk is carried out by means of a compensation clutch, preferably an Oldham clutch, with radial bearing pins in the rotation signal generator, and corresponding thereto with radial bearing grooves in the hypocycloidal disk, or vice versa. According to a third embodiment, the mechanical coupling of the rotation signal generator in the internal recess of the hypocycloidal disk is carried out by means of at least one driving pin, and corresponding thereto with at least one driving elongate hole in the hypocycloidal disk, or vice versa.

In order, in particular, to achieve a high angular resolution in the angle sensor, the rotating component can have at least one further satellite which is coupled to its circumference, rotates by means of its rotation and has an angle sensor. However, there can also be at least one further satellite with an angle sensor but this is coupled to the one satellite.

In a further advantageous manner, the angle sensor and/or the rotation sensor are each composed of a magnetic signal generator which also rotates and in each case a magnetic sensor which is arranged adjacently, preferably a Hall sensor, an AMR sensor or a GMR sensor. However, other physical sensor methods, for example optical methods, are also possible. The sensors here may also be components of an evaluation circuit which is mounted on a printed circuit board, with the result that the angle variables and/or rotation variables can be evaluated according to a chip-on-board technology.

In the invention described here, the angle sensor and the rotation sensor can therefore be arranged under a satellite, which has many advantages, for example in terms of installation space and angular resolution. Furthermore, in the invention described here, the tumbling movement of the hypocycloidal gear is again converted into a rotational movement of the signal generator of the rotation sensor, or the signal generator is mounted in a locationally fixed fashion in the hypocycloidal disk. This enables said signal generator to also be capable of being evaluated with a high angular resolution, for example with an angular magnet which is magnetized diametrically and has two Hall ICs which are rotated by 90 degrees with respect to one another, or a cylinder magnet which is magnetized diametrically and has a centrally positioned 2-axis Hall IC.

In a use as a steering angle sensor, it is therefore possible also to use sensor elements which can be actuated and evaluated easily, in addition to the cost-effective arrangement which can be implemented for small installation spaces. Such sensors detect the absolute angle over a plurality of steering angle rotations with a small angular resolution of approximately 0.1°. Furthermore, such a steering angle sensor according to the invention can also be "True Power On" capable after the motor vehicle starts, even with a discharged or disconnected battery, i.e. the initialization angle is 0°, which is possible with the mechanical rotation sensor system. Other systems consume a quiescent current in the "ignition off" state and have to be re-initialized after discharging of the battery.

The invention can easily be embodied either as a simple "Low Cost" design or as a relatively expensive design for safety-critical requirements, with the adaptation being able to respectively take place mainly via the electronic components, for example, one or two microprocessors, single or double Hall ICs, simple bus protocols such as PWM or SENT or relatively complex bus protocols such as CAN or Flexray.

BRIEF DESCRIPTION OF THE DRAWING

Exemplary embodiments of the invention are explained with reference to the figures in the drawing, in which:

FIG. 1 shows a schematic plan view of a steering angle sensor as an arrangement according to the invention with an angle sensor and a rotation sensor on, in each case, one satellite, FIG. 2 shows a detailed view of the rotation sensor according to FIG. 1 with a hypocycloidal transmission as an exploded view, FIG. 3 shows a detailed view of the hypocycloidal transmission according to FIG. 2 in the assembled state, FIG. 4 shows a detailed view of an embodiment of the hypocycloidal transmission with a locationally fixed signal generator in the assembled state, FIG. 5 shows a basic view explaining the function of the hypocycloidal transmission, FIG. 6 shows a diagram in which the sensor signals corresponding to the angle profiles and rotation profiles can be seen, FIGS. 7 to 9 show various embodiments of the mechanical coupling in the hypocycloidal transmission.

WAYS OF EMBODYING THE INVENTION

Figure 10:
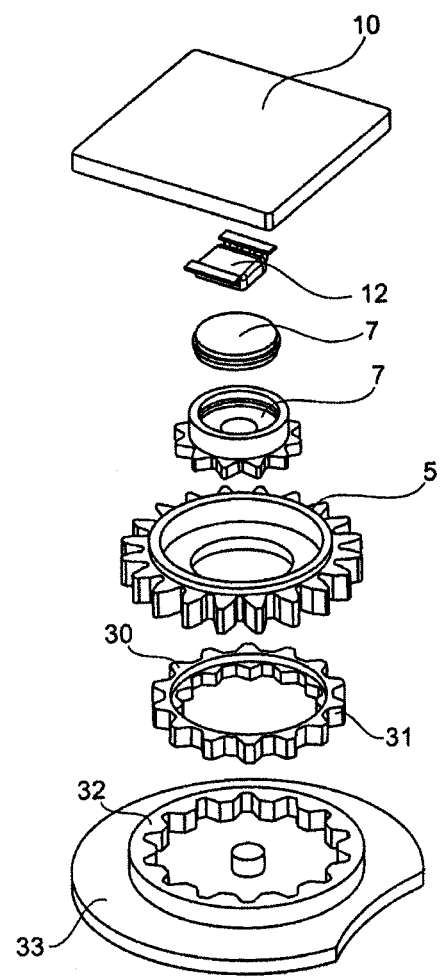
FIG. 10 shows an embodiment with a hypocycloidal gearwheel.

FIG. 1 shows an arrangement of a steering angle sensor 1 with a rotor 2 which is driven by a steering shaft (not shown here) of a vehicle, and has an external gearwheel. The steering angle sensor 1 therefore detects the rotation angle of the steering shaft since the steering shaft drives the rotor 1, and the latter drives, via the external toothing, a satellite 3 with an angle sensor system (not shown here) which is positioned in an axis-parallel fashion with respect to the steering shaft.

The angle sensor system with an angle signal generator which determines the precision angle of the steering shaft with, for example, approximately 0.1° angular resolution, is therefore located on satellite 3. The angle signal generator is positioned in a locationally fixed fashion in the satellite 3 and rotates synchronously therewith, and an angle sensor which detects the rotation of the angle signal generator (not shown here) is positioned with respect to the latter.

A rotation sensor system according to the invention which determines the rotation of the satellite 5 is located on a satellite 5. Owing to a hypocycloidal transmission which is driven by the satellite 5 and which is explained on the basis of the following figures, a rotation signal generator, driven by this transmission, of a rotation sensor system 6 rotates over the entire angular range, to be measured, of the steering shaft with a maximum of 1 revolution.

The satellite 5 with the rotation sensor system preferably rotates through a maximum 1 revolution over the entire steering angle range, but it can rotate over a plurality of revolutions of the steering shaft, in which case a Nonius which can be evaluated must then be present between the periodic signals of the angle sensor and the rotation sensor, and it can be calculated by means of an electronic evaluation.

For example, customary steering shafts have an angle range of 4 to 6 revolutions, which corresponds to an angle range of 1440° to 2160°. A rotation sensor which detects the rotation of the signal generator of the rotation sensor system 6 is positioned with respect to the latter.

According to one exemplary embodiment (not shown here), the satellite 3 can also be omitted and the function of the angle sensor can then also be carried out with the satellite 5.

As is apparent from FIG. 1, the rotor 2 which is driven by the steering shaft drives the satellite 5 of the rotation sensor system 6. The satellite 5 which can be seen more clearly from FIGS. 2 and 3 is mounted rotatably by means of a signal generator 7, for example a cylindrical magnet, and it can in turn be mounted rotatably by means of a housing 8. Furthermore, a hypocycloidal disk 9 and a printed circuit board 10 with Hall-ICs are present as sensors of the sensor systems.

FIG. 4 shows that the signal generator 7 is mounted in a locationally fixed fashion in the hypocycloidal disk 9 and is, for example, a cylindrical magnet which then carries out a tumbling movement with respect to the sensor system (not illustrated here).

FIG. 5 shows, in section, how the hypocycloidal disk 9 is positioned eccentrically with respect to the rotation axis of the satellite 5, at a distance E. The center of rotation of this eccentrically positioned hypocycloidal disk 9 therefore rotates on a circular path with a radius E about the rotation axis of the satellite 5. The cylinder of the hypocycloidal disk 9 always has contact with a static hollow cylinder 11 here, which is, for example, a contour of the surrounding housing 8. The axis of symmetry of the static hollow cylinder 11 is concentric with respect to the center of rotation of the satellite 5. If the mechanical friction between the hypocycloidal disk 9 and the hollow cylinder 11 is large enough, the hypocycloidal disk 9 revolves or rolls on the hollow cylinder 11. Furthermore, a sensor 4 with a printed circuit board 10 can be seen.

The angle at which the hypocycloidal disk 9 rotates here during a revolution of the satellite 5 results from the difference between the circular circumferences of the relatively small cylinder of the hypocycloidal disk 9 and the relatively large hollow cylinder 11 of the housing 8. This difference can also be influenced by the two parameters of the diameter D1 of the hypocycloidal disk 9 and the distance E. The diameter D2 of the hollow cylinder 11 and therefore the difference between the two circular circumferences ΔU results from the two parameters.

Accordingly, the circular path movement of the center of rotation of the hypocycloidal disk 9 still has to be converted into a purely rotational movement so that accurate angle detection is possible by means of the sensor on the rotation sensor system 6. As already described above, the signal generator of the rotation sensor system 6 is rotatably mounted in a concentric fashion with respect to the satellite 5. This therefore requires driving which compensates the circular path movement and during which the hypocycloidal disk 9 drives the signal generator 7 in rotation.

The rotation angle δ of the hypocycloidal disk 9 is calculated as D2=D1+2*E from the circumference U1 of the hypocycloidal disk 9

$$U1 = \pi * D1,$$

the circumference U2 of the static hollow cylinder $$U2 = \pi * D2, \text{ with the difference}$$

$$\Delta U = U1 - U2 = 2 * \pi * E.$$

The following ratio then applies to the angles:

$$\frac{\delta}{360°} = \frac{\Delta U}{U1} \Leftrightarrow \delta = 360° \cdot \frac{\Delta U}{U1}$$

corresponding to $$\delta = \frac{720° \cdot E}{D1}.$$

FIG. 6 shows the profile 12 of the rotation signal which is here a signal which is periodic over 120° over an angle of 1800° corresponding to 5 revolutions having the profile 13.

There are multiple variants of the compensating driving here, specifically a gearwheel hypocycloidal transmission according to FIG. 7 with internal toothing 20, and on the signal generator by means of an external toothing 21. The number of teeth of the two gearwheels is the same here. This hypocycloidal transmission, implemented by means of gearwheels, entrains the signal generator, allows it to rotate synchronously with respect to the hypocycloidal disk 9, and compensates the circular path movement of the center of rotation of the hypocycloidal disk.

In another variant, a compensation clutch 22 according to FIG. 8, for example what is referred to as Oldham clutch, is used. By means of this compensation clutch 22, the rotation of the hypocycloidal disk 9 is transmitted synchronously to the signal generator. The longitudinal bearing points 23 which are positioned over 90° on the hypocycloidal disk 9 and on the signal generator also compensate the circular path movement of the center of rotation of the hypocycloidal disk here.

According to a further variant according to FIG. 9, a driving pin 24 can be mounted on the signal generator, which driving pin 24 engages in an elongate hole 25 in the hypocycloidal disk 9. The driving pin 24 compensates the tumbling movement of the hypocycloidal disk 9 by virtue of the fact that it has play in the radial direction in the elongate hole 25. In the tangential direction, the driving pin 24 is mounted, as it were, free of play, as a result of which the signal generator is driven in rotation by the hypocycloidal disk 9.

In all the cases described, the signal of the rotating rotational signal generator is detected by the rotation sensor 6, and the absolute steering angle can be calculated together with the signal of the angle sensor in an evaluation unit. It is also to be noted here that the absolute steering angle can also be calculated solely with the rotation sensor 6, i.e. without the angle sensor 4, in which case only the angular resolution is greater, approximately 0.5°, and the angular accuracy is lower. The additional angle sensor 4 improves the angular resolution and the angular accuracy of the calculated absolute steering angle.

FIG. 10 shows a further exemplary embodiment of hypocycloidal transmission according to the invention with a printed circuit board 10 and Hall ICs 12, in which, in contrast to the embodiment according to FIGS. 2 and 3, a hypocycloidal gearwheel 30 is present which also has a toothing 31 on the outside, and corresponds in the same way, as described above, to an internal toothing 32 in a housing 33 of corresponding design, with the result that further stepping down of the rotation is also possible in this way. According to this exemplary embodiment, the toothing of the hypocycloidal gearwheel 30 has at least one tooth fewer than the internal toothing 32.

The invention claimed is:

1. An arrangement for detecting the rotation angles on a rotating component, comprising:
   signal generators and sensors which detect changes in a physical variable which are generated by the signal generators as a function of the change in rotation angle of the rotating component, wherein signals generated by the signal generators are evaluated digitally,
   first satellite coupled to the circumference of said rotating component, wherein the first satellite rotates as a result of the rotation of the rotating component and has a relatively small circumference,
   wherein the first satellite comprises:
   an angle sensor driven by the first satellite via an axially coupled hypocycloidal transmission,
   a hypocycloidal disk which also rotates and whose rotational speed can be stepped down using the hypocycloidal transmission so that a revolutions per minute measure of the rotating component and an absolute steering angle is determined by a rotation sensor over a plurality of revolutions of the rotating component,
   wherein the hypocycloidal transmission is composed of the hypocycloidal disk which is coupled axially to the first satellite and which is offset in axis-parallel fashion with respect to the first satellite by a predefined absolute value, and
   wherein the rotation signal generator and the first satellite are concentric and the first satellite has a contour which is offset with respect to its axis of symmetry by the predefined absolute value and is coupled to the hypocycloidal disk.

2. The arrangement as claimed in claim 1, wherein the rotation signal generator is mounted in a locationally fixed manner in the hypocycloidal disk and the hypocycloidal disk is coupled to a static hollow cylinder.

3. The arrangement as claimed in claim 1, wherein the rotation signal generator is mechanically coupled in an internal recess of the hypocycloidal disk by a corresponding gearwheel structure.

4. The arrangement as claimed in claim 1, wherein the rotation signal generator is mechanically coupled in an internal recess of the hypocycloidal disk by a compensation clutch, wherein the compensation clutch has one selected from a group consisting of at least two longitudinal bearing pins which are offset by 90°, and corresponding thereto the hypocycloidal disk and the rotation signal generator each have at least one longitudinal bearing groove, and at least two longitudinal bearing grooves which are offset by 90°, and corresponding thereto the hypocycloidal disk and the rotational signal generator each have at least one longitudinal bearing pin.

5. The arrangement as claimed in claim 1, wherein the rotation signal generator is mechanically coupled in an internal recess of the hypocycloidal disk by at least one driving pin in the signal generator, and corresponding thereto with at least one driving elongate hole in the hypocycloidal disk or in the signal generator.

6. The arrangement as claimed in claim 1, wherein the rotating component has at least one second satellite which is coupled to the circumference of the rotating component, wherein the at least one second satellite rotates as a result of the rotation of the rotating component and comprises a second angle sensor.

7. The arrangement according to claim 1, further comprising a second satellite which rotates as a result of the rotation of the rotating component and comprises a second angle sensor, wherein the second angle sensor is coupled to the first satellite via a hypocycloidal gearwheel.

8. The arrangement as claimed in claim 7, wherein the magnetic sensor is one of a Hall sensor, an AMR sensor, or a GMR sensor.

9. The arrangement as claimed in claim 1, wherein the angle sensor and the rotation sensor are each composed of a magnetic signal generator which also rotates, and wherein in each case a magnetic sensor is arranged adjacent to each of the angle sensor and the rotation sensor.

10. The arrangement as claimed in claim 9, wherein the angle and rotation sensors are components of an evaluation circuit which is mounted on a printed circuit board, for evaluating the angle variables and rotation variables according to a chip-on-board technology.

11. The arrangement as claimed in claim 1, wherein the arrangement is a component of a steering device in a motor vehicle.

* * * * *